L. R. & R. L. GRUSS.
CUSHION VEHICLE WHEEL.
APPLICATION FILED MAY 26, 1909.

967,515.

Patented Aug. 16, 1910.

Witnesses.
F. Hasberg.
F. E. Maynard.

Inventors.
Raymond L. Gruss
Lucien R. Gruss
by Geo. H. Strong
their Atty

UNITED STATES PATENT OFFICE.

LUCIEN R. GRUSS AND RAYMOND L. GRUSS, OF CHICO, CALIFORNIA, ASSIGNORS TO AUTO-COMPRESSED-AIR-WHEEL COMPANY, OF CHICO, CALIFORNIA, A CORPORATION OF CALIFORNIA.

CUSHION VEHICLE-WHEEL.

967,515.      Specification of Letters Patent.    Patented Aug. 16, 1910.

Application filed May 26, 1909. Serial No. 498,577.

*To all whom it may concern:*

Be it known that we, LUCIEN R. GRUSS and RAYMOND L. GRUSS, citizens of the United States, residing at Chico, in the county of Butte and State of California, have invented new and useful Improvements in Cushion Vehicle-Wheels, of which the following is a specification.

Our invention relates to vehicle wheels, and pertains especially to cushioning devices therefor.

The object of the invention is to provide a practical resilient, non-puncturable wheel, especially adapted for automobiles and designed to dispense with the inflatable rubber tubes now commonly used. This object is accomplished by a suitable arrangement of radially disposed cylinders with spoke plungers working therein; the plungers and cylinders having suitable valve-controlled ports; the cylinders having suitable dash-pot connections with the hub; all suitably arranged and operative so that when the weight of the vehicle is brought in line with either of the cylinders, the cylinder being below the axle, the air in the cylinder will be compressed, thus forming a cushion for the wheel.

The invention consists in the combination of parts, and in details of construction which will be more fully explained by reference to the accompanying drawings, in which—

Figure 2:
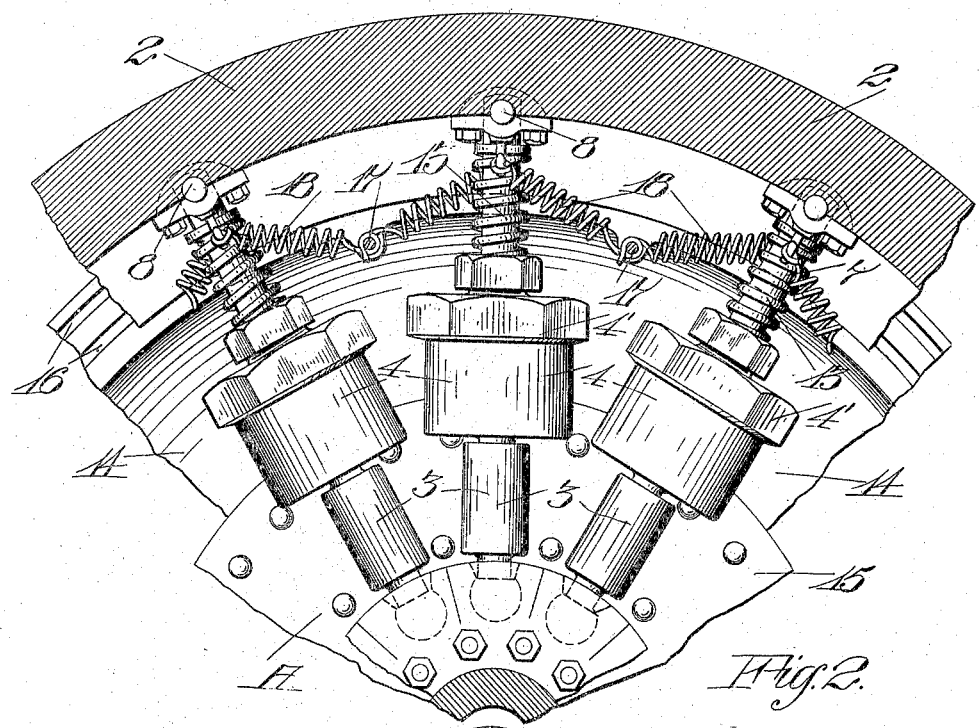
Figure 1:
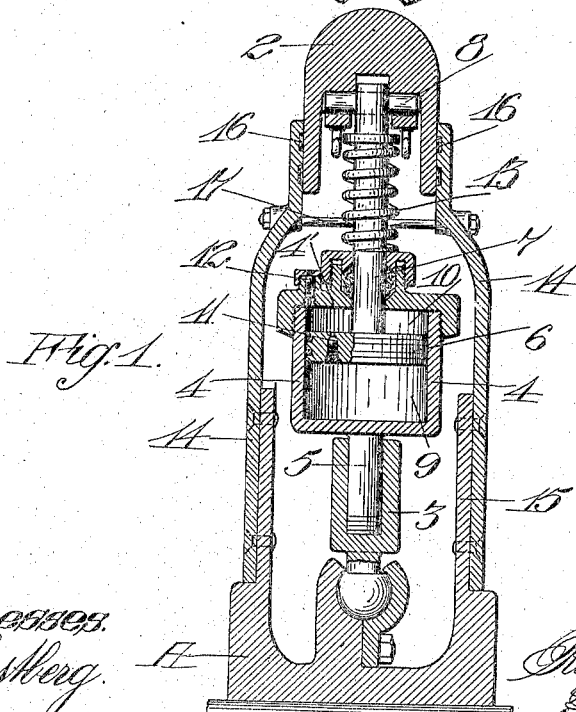

Figure 1 is a section through one-half of the wheel. Fig. 2 is a side elevation of a fragment of the same, in partial section, and with the side plate removed.

A represents the hub of the vehicle, and 2 the rim, which latter may be of any suitable construction and provided with any desired form of tire.

The cushioning means are disposed between the hub and rim and comprise essentially a series of spokes, each made up of a socket member 3 pivoted to the hub, a cylinder 4 having a stem 5 sliding airtight in the socket 3, a plunger or piston 6 working in the cylinder, and the stem 7 of the plunger pivoted at 8 to the rim. The space 9 in the cylinder forms a compression chamber and the space 10 on the opposite side of the piston forms an air inlet chamber. The plunger is provided with a normally closed valve 11, adapted to open into the chamber 9 when the piston moves outwardly. If desired, the chamber 10 may be provided with an inwardly opening intake valve 12, which is adapted to open to admit air when the piston moves inwardly. A helical spring 13 surrounding the stem 7 and acting in opposition between the rim and the cylinder may be employed to maintain the piston normally at its farthest point of outward movement.

14 represents side sheathing plates secured to flanges 15 on the hub and inclosing the cushioning parts above mentioned, the outer edges of the plates having a snug sliding fit with the sides of the rim; suitable packing rings 16 carried by one or the other of the parts serving to exclude moisture and dirt from the interior of the wheel. These plates are connected and braced at suitable intervals inside the rim and between the spokes by suitable means, as the bolts 17.

18 are springs which are connected to the outer ends of the spokes adjacent to the rim and to the bolts 17 for the purpose of maintaining the spoke members normally radial to the wheel.

The stem member 5 working inside of socket 3 serves the purpose of a dash-pot to prevent the pounding of the piston inside of a cylinder; the stem 5 having snap rings working snug inside the socket 3, and this plunger stem 5 operates to produce a vacuum, so that if a piston is drawn suddenly out, and engages its head 4', this telescoping movement of the plunger stem 5 in the socket will allow for a certain elongation of the spoke and relieve jar and strain on the parts. There may be any number of cylinders and connecting parts applied or arranged in the wheel so as to obtain the desired strength and cushioning effects necessary. The pivoting of a spoke member at opposite ends both to the hub and to the rim is essential to an operative structure.

In practice each cylinder as it comes underneath the hub to support a portion of the weight of the vehicle has its chamber 10 filled with air as the plunger moves upwardly to compress the air already in the chamber 9; the valve 11 in the plunger closing during this compression movement, and the valve 12 opening in the cylinder. As this cylinder comes again to the top of the hub and is relieved of its load, the combined action of the compressed air in the chamber 9 and of the spring 13 operates to move the piston 6 toward the outer end of the cylinder. In so doing, valve 12 closes, and as the piston approaches its outer limit of travel the valve 11 will open, provided there has been no leak from the chamber 9, so that the air at atmospheric pressure in 10 will be allowed to pass over into chamber 9 and equalize the pressure on both sides of the piston, thus filling the chamber 9 with air at atmospheric pressure ready for the next inward stroke of the piston. If the tension of the spring is such as would allow or cause the piston to bump against the head 4' of the cylinder, the plunger stem 5 will be pulled slightly outward in its socket 3, thereby producing a vacuum in the socket which will return the plunger to its seat therein; yet at the same time the action of the plunger and socket will serve as a yielding expansion means to save strain on the parts. The side plates 14, through the medium of their sliding connections with the rim and the brace rods 17, give lateral rigidity to the wheel.

Having thus described our invention, what we claim and desire to secure by Letters-Patent, is:

1. In a vehicle wheel, the combination of a hub and an exterior rim, and connecting spoke members therebetween, said spoke members each comprising a cylinder member having a sliding connection with a socket member, which socket member is pivoted to the hub, a piston working in the cylinder, the stem of said piston pivotally connected with the rim, and springs connecting with the spoke members and to a part rigid with the hub for maintaining the spoke members normally radial of the wheel.

2. In a vehicle wheel, the combination of a hub and a rim, and connecting spoke members therebetween, said spoke members each comprising a cylinder member having a sliding connection with a socket member, and forming therewith a dash-pot connection, said socket member being pivoted to the hub, a piston working in the cylinder, the stem of said piston pivotally connected with the rim, and a spring acting on the piston to move the latter outwardly in its cylinder.

3. In a wheel, the combination of a hub and a rim, of spoke members each pivotally connected to the rim and also to the hub, and each of said spoke members including a socket member pivoted to the hub to turn in the plane of the wheel, a cylinder member having telescopic connections with said socket to provide a dash-pot connection therewith, a valved piston in the cylinder, the stem of the cylinder pivotally connecting with the rim, and means for maintaining the spokes in the same plane.

4. In a wheel, the combination of a hub and a rim, of spoke members each pivotally connected to the rim and also to the hub, and each of said spoke members including a socket member pivoted to the hub to turn in the plane of the wheel, a cylinder member having telescopic connections with said socket to provide a dash-pot connection therewith, a valved piston in the cylinder, the stem of the cylinder pivotally connecting with the rim, and means for maintaining the spokes in the same plane, springs acting on the spoke members to move the pistons toward the outer ends of the cylinders.

5. In a wheel, the combination of a hub and a rim, of spoke members each pivotally connected to the rim and also the hub, and each of said spoke members including a socket member pivoted to the hub to turn in the plane of the wheel, a cylinder member having telescopic connections with said socket to provide a dash-pot connection therewith, a valved piston in the cylinder, the stem of the cylinder pivotally connecting with the rim, and means for maintaining the spokes in the same plane, springs connecting with the spoke members and to a part rigid with the hub for maintaining the spokes normally radial to the wheel.

In testimony whereof we have hereunto set our hands in presence of two subscribing witnesses.

LUCIEN R. GRUSS.
RAYMOND L. GRUSS.

Witnesses to signature of Lucien R. Gruss:
  W. K. HAYS,
  MYRTLE McGUIRE.

Witnesses to the signature of Raymond L. Gruss:
  CHARLES A. PENFIELD,
  CHAS. E. TOWNSEND.